United States Patent [19]

Hazlett et al.

[11] Patent Number: 4,899,819
[45] Date of Patent: Feb. 13, 1990

[54] METHOD FOR SUSPENDING WELLS

[75] Inventors: Randy D. Hazlett, Dallas; Alfred R. Jennings, Jr., Plano, both of Tex.

[73] Assignee: Mobil Oil Corporation, New York, N.Y.

[21] Appl. No.: 253,292

[22] Filed: Oct. 5, 1988

Related U.S. Application Data

[63] Continuation-in-part of Ser. No. 890,679, Jul. 30, 1986, Pat. No. 4,817,719.

[51] Int. Cl.$^4$ ............................................. E21B 33/13
[52] U.S. Cl. .................................. 166/285; 166/295; 166/292
[58] Field of Search ............... 166/285, 291, 292, 294, 166/295

[56] References Cited

PUBLICATIONS

"Chemical Stability of Polyacrylamide Under Simulated Field Conditions", Yang; SPE; 1985.

Primary Examiner—William P. Neuder
Attorney, Agent, or Firm—Alexander J. McKillop; Charles J. Speciale; Charles A. Malone

[57] ABSTRACT

A process for killing and suspending mixtures of hydrocarbonaceous fluid production, particularly oil, in a formation containing same which minimizes formation damage. First, a "spacer volume" of liquid containing a chemical blowing agent is directed into the formation's productive interval. Said blowing agent decomposes in the formation and generates gas sufficient to force hydrocarbonaceous fluids away from a wellbore in said formation. Thereafter, a solidifiable pumpable gel mixture is placed via a wellbore into the formation's productive interval and also within said wellbore. Said mixture solidifies in the formation and forms a gel plug within the wellbore. Thereafter, a light weight cement is placed over said gel plug effectively "killing" and suspending the production of hydrocarbonaceous fluids.

29 Claims, 1 Drawing Sheet 4,899,819

METHOD FOR SUSPENDING WELLS

CROSS-REFERENCE TO RELATED APPLICATIONS

This application is a continuation-in-part of Application Ser. No. 890,679, filed July 30, 1986, entitled Method for Suspending Wells now U.S. Pat. No. 4,817,719 which issued on Apr. 4, 1989.

FIELD OF THE INVENTION

This invention is directed to a method for minimizing formation damage when a well is "killed" and production is suspended.

BACKGROUND OF THE INVENTION

When productive intervals are completed in exploratory wells, it is common practice to "suspend" wells for a period of time to allow construction of pipelines and gathering facilities in conjunction with field development. In remote locations (offshore, e.g.), it may even be necessary to plug and abandon zones found productive until development wells can be drilled.

In many cases, it is not known how long a well may be suspended. Therefore, thorough measures are taken to isolate the productive interval from the surface. For example, following a flow test of the zone indicating productivity at commercial rates, the zone will be "killed" with completion fluid, a bridge plug set above the perforated interval, and a cement plug placed on top of the bridge plug. Two or three additional bridge plug/cement plug combinations may be placed above the interval to insure zone isolation during suspension.

When the suspended well is re-entered to open the interval to production, the plugs must be drilled out. Frequently this results in substantial loss of drilling fluid to the zone. This is especially true if the zone was stimulated (fracturing or acidizing, e.g.) as part of the initial well test program. Once the plugs are drilled out, the zone is opened to production. Usually, a lower rate than the initial test rate is observed because of damage which occurred during re-entry.

Therefore, what is needed is a method which will allow a producing well to be "killed" and suspended without causing undue formation damage. Utilization of said method would result in maintaining the producing rate near that initially determined. Well re-entry costs would be reduced, and formation damage minimized.

SUMMARY OF THE INVENTION

This invention is directed to a method for "killing" and suspending oil production in a well which results in a reduction in formation damage. In the practice of this method, a "space volume" of liquid containing a surfactant and a chemical blowing agent is directed into the formation's productive interval. Surfactant contained in said liquid causes the formation to become more receptive to a solidifiable gel solution. Said chemical blowing agent decomposes and generates a gas which blocks formation pores and excludes formation fluids. Thereafter, a pumpable solidifiable gel mixture is placed into the wellbore substantially at the formation's productive interval. Subsequently, the gel mixture solidifies after entering said productive interval of the formation while causing a solid gel plug to form in the wellbore substantially in the area of the wellbore's productive interval. Said solidified gel mixture within the formation and the wellbore is sufficient to withstand environmental conditions in the formation depths, including pressures. As a result of the solidified gel mixture in the formation and gel plug within the wellbore, oil and other hydrocarbonaceous fluids cease to flow from the formation into said wellbore, thus "killing" the well.

Thereafter, the depth of the top of the solid gel plug is determined so that a desired amount of light (low density) concrete can be placed over said gel plug. Next, a desired amount of a light concrete is placed over said gel plug in an amount sufficient to suspend the production of hydrocarbonaceous fluids from said formation to the surface.

It is therefore an object of this invention to eliminate the need for a kill or completion fluid when "killing" a well.

It is another object of this invention to eliminate the need for a bridge plug when well production is suspended.

It is yet another object of this invention to minimize formation damage resultant from loss of drilling fluid which in prior art methods often entered the productive interval of a formation thereby decreasing the formation's permeability.

It is a yet further object of this invention to reduce well re-entry costs upon termination of the well suspension period.

It is a still yet further object of this invention to maintain the production rate substantially near the initial production rate upon termination of the well suspension period.

It is a still yet even further object of this invention to pump the required material into the wellbore without the need to circulate them into and out of the wellbore as was required in prior art method.

DESCRIPTION OF THE PREFERRED EMBODIMENTS

Figure 1:
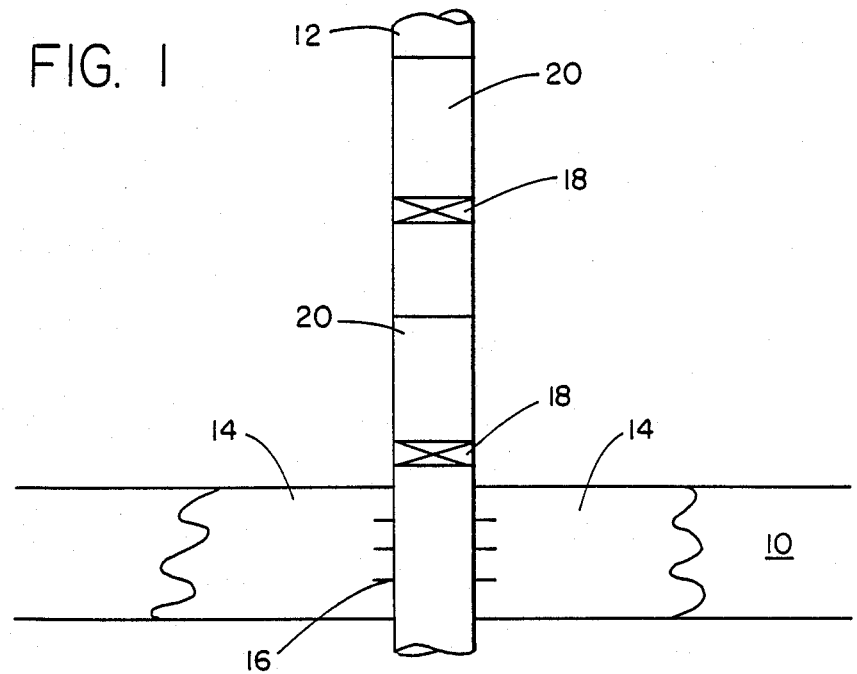
FIG. 1 is schematic representation of a prior art method for "killing" and suspending oil production in a well.

When "killing" a productive interval of a well, as shown in FIG. 1, a kill fluid 14 is generally injected in wellbore 12. Said kill fluid enters formation 10 via perforations 16 "drowning" the productive interval in formation 10. Thereafter, a bridge plug 18, which is generally of a metallic construction, is caused to bind securely against wellbore 12. Once bridge plug 18 is securely bound, a cement plug 20 hardens and with the bridge plug causes the productive interval of wellbore 12 to be closed to the surface and thereby suspends oil production into said wellbore. To more effectively secure the productive interval against oil production, multiple cement plug/bridge plug combinations can be utilized in wellbore 12 as is shown in FIG. 1.

In practice of this invention, a spacer volume of a liquid containing a surfactant and a chemical blowing agent is pumped directly into the wellhead. This spacer volume of liquid is used to clear the formation and well of materials which might interfere with adherence and solidification of a gel mixture. Surfactant contained in said liquid causes the formation to become more receptive to a solidifiable gel solution. A surfactant enhances the displacement efficiency of hydrocarbons by lowering interfacial tension. A surfactant also alters formation wettability to achieve better bonding of gel to rock. Generally, about two wellbore tubing volumes of fluid will be sufficient to clear and condition said formation and wellbore. The spacer volume of liquid comprises an aqueous medium into which is placed a surfactant and a decomposable chemical blowing agent. When utilized in the spacer volume of liquid the surfactant can stabilize a foam or can assist in dispersing a blowing agent. Said aqueous medium can comprise fresh water, formation brine, sea water, brackish water, and mixtures thereof.

Foam-forming surfactants suitable for use in the present invention can comprise substantially any which are capable of being dissolved or dispersed in an aqueous liquid solution containing a nitrogen containing compound and any added activator or inhibitor which remains substantially inert during a nitrogen-gas-producing reaction of the nitrogen containing compounds. Examples of suitable surfactants comprise nonionic and anionic surfactants, e.g., Siponate DS-10 available from American Alcolac Company, mixtures of the Siponate or similar sulfonate surfactants with sulfated polyoxyalkylated alcohol surfactants, e.g., the NEODOL sulfate surfactants available from Shell Chemical Company; sulfonate sulfate surfactant mixtures, e.g., those described in the J. Reisberg, G. Smith and J. P. Lawson U.S. Pat. No. 3,508,612; petroleum sulfonates available from Bray Chemical Company; Bryton sulfonates available from Bryton Chemical Company; Petronates and Pyronates available from Sonnoborn Division of Witco Chemical Company; fatty acid and tall oil acid soaps, e.g., Actynol Heads from Arizona Chemical Company; nonionic surfactants, e.g., Triton X100; and the like surfactant materials which are soluble or dispersible in aqueous liquids. These surfactants are disclosed in RE 30,935 which issued to Richardson et al. on May 18, 1982. This patent is incorporated herein by reference.

Chemical blowing agents which can be utilized herein include dinitrosopentamethylenetetramine (DNPT), blends of sodium hydrogen carbonate and nitrogen releasing agents such as p-toluene sulfonyl hydrazide, and p,p'-oxybis (benzenesulfonyl hydrazide). Other chemical blowing agents which can be utilized inlcude azodicarbonamide, and alkali metal salts of azodicarboxylic acid.

DNPT and sodium hydrogen carbonate can be used in conjunction with said surfactant in an aqueous medium. Since DNPT is only slightly soluble in cold water, warm water is required to achieve significant water solubility. Solutions of 0.5% by weight can be obtained at ambient temperature. Solubilities in excess of 1% by weight are achieved above 40° C. Warm water can be obtained by preheating water to be injected or by reinjecting warm produced water. Enhancement of the low temperature solubility of DNPT can be obtained by the use of chemicals. Said chemicals include dimethylformamide (DMF) and dimethylsulfoxide (DMSO). Should it be desired to accelerate the decomposition of DNPT in-situ, weak acids such as ammonium sulfate or acetic anhydride can be added to the formulation. As will be understood by those skilled in the art, the amount of chemical utilized will depend upon such factors as the amount and temperature of water utilized, chemical composition of the water, the amount of DNPT utilized, and the reservoir pressure.

Although sodium hydrogen carbonate and other bicarbonate foaming agents can be utilized, they are limited by an equilibrium which reduces yield with increasing pressure. To overcome this limitation, bicarbonate decomposition can be pH driven with formulations containing suitable compounds for pH depression with temperature increase. One such compound is the nitrogen releasing blowing agent, p-toluene sulfonyl hydrazide. Bicarbonate decomposition generates carbon dioxide. The addition of a suitable amount of p-toluene sulfonyl hydrazide, which liberates water soluble, acidic byproducts upon decomposition, causes substantially increased volumes of carbon dioxide to be released from solution due to bicarbonte decomposition.

Azodicarbonamide similar to DNPT is soluble in water only at elevated temperatures. Since azodicarbonamide is available in powder form with average particle size in the micron range, solid dispersons can be utilized. A disperson can be made with adequate mixing by placing micron sized azodicarbonamide in a solution containing a suitable surfactant. The amount of azodicarbonamde should be sufficient to create the volume of gas required to obtain a fluid diversion effect. One such class of surfactants is alkyl naphthalene sulfonates, which can be purchased from GAF as the Nekal series, located in New York. Should it be desired to accelarate the decomposition of azodicarbonamide, an alkali carbonate can be utilized to modify decomposition kinetics. Alkali carbonates which can be utilized include sodium carbonate and potassium carbonate. Thus, azodicarbonamide will prove to have enhanced potential for use in carbonate reservoirs. Azodicarbonamide can be included in a microemulsion for injection into the formation. A method for making a microemulsion is disclosed in U.S. Pat. No. 4,008,769 which issued to Chang on Feb. 22, 1977. This patent is incorporated by reference herein.

Where alkaline conditions are acceptable, the sodium salt of azodicarboxylic acid can be used as a chemical blowing agent. This blowing agent can be formed on site by the treatment of azodicarbonamide with sodium hydroxide and an alkali carbonate with resulting ammonia evolution. When heated, this extremely water soluble salt liberates nitrogen and carbon dioxide, yet it is very stable at room temperature in basic solutions having a pH greater than 12. Surfactant addition can be reduced or even eliminated in some instances due to surfactant production in-situ. The pH decline from hydroxde consumption will accelerate the foam decomposition reaction. Toluene sulfonyl hydrazide and p,p'-oxybis(benzenesulfonyl hydrazide) also develop water solubility at high pH, but the modified azodicarbonamide is preferred.

In one embodiment of this invention, any one of the chemical blowing agents above mentioned can be incorporated into an aqueous medium for utilization as said spacer volume of liquid. The amount of blowing agent utilized will vary from about 0.05% to about 0.5% by weight. The gas generated upon decomposition will be sufficient to form gas as individual bubbles but insufficient to cause foam to form at typical reservoir pressures. Since the carrier fluid for the chemical blowing agent is an aqueous medium, bubbles which nucleate will do so in preferential pathways for water flow. Pore blocking and fluid diversion will result in localized increase in flow resistance. Since the decomposing chemical agent releases a gas which causes bubbles to form and block pores within a more permeable zone of the formation, subsequently injected solidifiable gel will be directed to a less permeable zone in the formation thereby minimizing the amount of gel used and facilitating the flow of hydrocarbonaceous fluids into the well once production is commenced. If it is desired to create additional gas, the amount of chemical blowing agent can be increased.

When it is desired to form a foam, a chemical blowing agent and a surfactant are added into an aqueous medium in an amount sufficient to create a foam at reservoir conditions. The amount of chemical blowing agent utilized will be from about 0.51% to about 5.0% by weight. The amount of surfactant utilized will be an amount sufficient for foam stabilization and will generally be from about 0.1% to about 2% by weight. After mixing the blowing agent and surfactant together in an aqueous medium, a spacer volume of the aqueous medium is injected into the formation. Once the medium is within the formation, the chemical blowing agent decomposes thereby liberating sufficient gas to create a foam. The foam which is generated is sufficient to close pores in a more permeable zone of a formation. A solidifiable gel is thereafter injected into the formation and is then diverted to a less permeable zone. Placement of the spacer volume of liquid into the formation substantially inhibits the production of hydrocarbonaceous fluids from the formation during the subsequent steps of this invention.

As is known to those skilled in the art, the pumping or injection rates utilized should be maintained below those rates which will create a pressure sufficient to fracture the formation.

In both embodiments, the chemical blowing agent is selected on the basis of reservoir temperature, mineralogy, depth, and environmental conditions. As required, pH buffers, accelerators, or inhibitors can be incorporated into the spacer volume of aqueous liquid prior to injection into the formation or reservoir. Choice of accelerators or inhibitors will be specific to the selected blowing agent. Accelerators which can be used for azodicarbonamide include alkali carbonates, basic metal salts of lead, cadmium, or zinc such as dibasic lead phthalate, and polyols such as glycols and glycerol. Inhibitors which can be utilized include barium salts and neutral pH buffers. Accelerators which can be used for DNPT include mineral acids and salts of mineral acids such as zinc chloride. Stabilizers which can be used for DNPT include oxides, hydroxides, or carbonates of calcium, barium, zinc, or magnesium. The size of the spacer volume of liquid will depend upon the extent of the prescribed treatment area. The injection rate of said spacer volume of liquid should be sufficient to allow fluid placement into the zone or zones desired to be treated prior to significant gas release. Bubbles or foam generated in a high permeability zone will lead to flow diversion and enhanced sweep of the formation or reservoir prior to injection of a solidifiable gel. Upon incorporation of these compounds in the spacer volume of liquid which is injected via wellbore 12 into formation 10, said compounds have the ability to minimize fluid retention, and condition the formation for greater receptivity of a solidifiable pumpable gel mixture.

Figure 2:
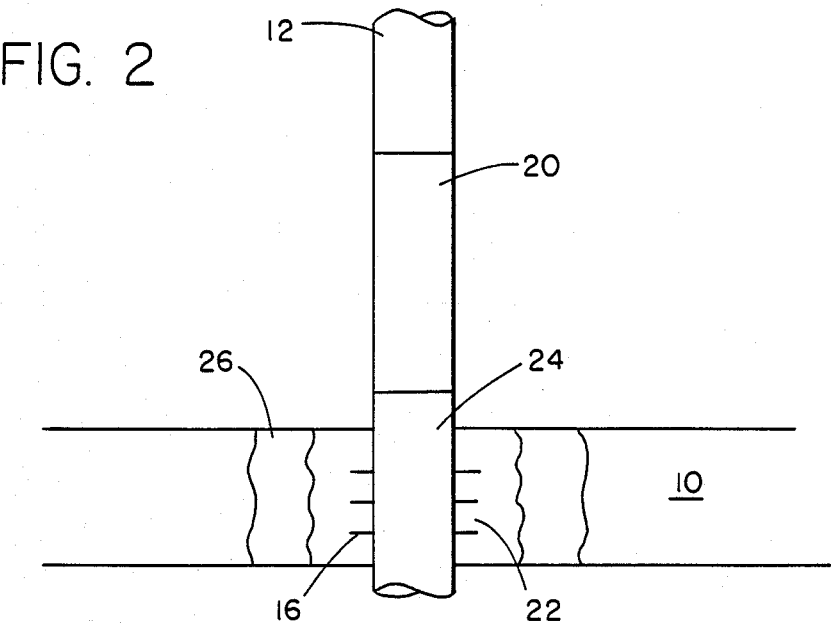
FIG. 2 is schematic representation of the method which is disclosed herein.

Afterwards, as is shown in FIG. 2, a pumpable solidifiable gel mixture is directed into wellbore 12, usually by pumping into the wellhead. Said gel mixture is allowed to flow down wellbore 12 in formation 10 until it comes in contact with the productive interval of formation 10. The injection or pumping rates should be maintained below those pressures which will cause the formation to fracture. At the productive interval, said gel mixture enters the productive interval of formation 10 via perforations 16. Sufficient solidifiable gel is allowed to enter said productive interval thereby closing off said interval to production of hydrocarbonaceous fluid mixtures, particularly oil. Additonal solidifiable gel material is allowed to enter wellbore 12 which material contacts said productive interval until said gel has filled said wellbore 12 above the productive interval.

The solidifiable gel material subsequently forms a solid gel plug 24 within wellbore 12. It also forms a solid formation gel 22 in the productive interval of formation 10. Gel plug 24, upon solidification, is of a composition and strength sufficient to support a cement plug 20 thereabove in addition to forming an impermeable barrier to the flow of fluids from the productive interval. Cement plug 20 is comprised of a light weight cement. Representative cements are foamed cements and a light (low density) cement sold by Haliburton under the Spherelite tradename. Similar cement compositions are disclosed in U.S. Pat. Nos. 3,902,911 and 4,120,360 which are hereby incorporated by reference. Upon hardening, the cement forms a further impermeable barrier to the flow of fluids from the productive interval of formation 10. As will be understood by those skilled in the art, quantities of "spacer" volumes of liquid 26, said gel mixture, and light weight cement will vary depending on formation parameters encountered. Also, a solidified gel plug, and a cement plug can be alternated in wellbore 12 until a sufficient number have been placed depending on the productive interval depth and length of the suspension period.

After the gel plug and light-weight cement plug have set, a pressure test is applied to the plug combination to insure competency and the desired plugging effect. Upon confirmation of the competency and plugging effect, the distance from the wellhead to the final light weight cement plug is determined for re-entry at a later date. This determination can be made by running a dummy or wireline into wellbore 12. When it is desired to commence production of hydrocarbonaceous fluids from said formation, cement plug 20 is drilled out and gel plug 24 caused to be removed. Said removal can be accomplished by mechanical or chemical means. Since the productive interval of formation 10 is closed from wellbore 12 by the solidified gel, any pressurized drilling fluid utilized to remove cement plug 20 from wellbore 12 will not enter the productive interval and damage it.

Since a kill fluid is not utilized in this invention, hydrocarbonaceous fluids, particularly oil, are produced through said productive interval at substantially the initial production rate once production resumes. Re-entry costs are substantially reduced since more costly drill bits are not required as a metallic bridge plug is not used.

One method of making a suitable pumpable mixture is discussed in U.S. Pat. No. 4,333,461 issued to Muller on June 8, 1982 which patent is hereby incorporated by reference. The stability and rigidity of gel plug 24 will depend upon the physical and chemical characteristics of the gel plug. As will be understood by those skilled in the art, gel plug 24 should be of a stability and rigidity which will withstand the weight of cement plug 20 and environmental well conditions.

Often, it wil be necessary to increase the density of the pumpable gel to obtain the desired stability and rigidity therein. To accomplish this a solid non-reacting material can be added to the pumpable gel mixture.

Preferred non-reacting solid materials include solid rock salt, calcium carbonate, and suitably crushed mollusk shells, such as oyster shells which are added to the gel mixture which will remain in the wellbore.

Other gel mixtures can be used to obtain a desired stability and rigidity. A preferred mixture used to obtain a desired stability and rigidity, for example, is a mixture of hydropropyl guar crosslinked with transitional metals and ions thereof. The purpose of the transitional metal ions is to provide increased strength, stability and rigidity for gel plug 24.

Hydropropyl guar is placed into the gel mixture in an amount of from about 0.70 to about 10.0 weight percent of said mixture. As preferred, hydropropyl guar is placed in said mixture in about 7.2 percent by weight of said mixture.

Metallic ions which can be used in the pumpable gel mixture include titanium, zirconium, chromium, antimony, and aluminum. The concentration of these transitional metals in the pumpable gel fluid will of course vary depending upon the environmental nature of the wellbore and formation. Although the exact amount of the metals required will vary depending on the particular application, it is anticipated that the metals should be included within the pumpable gel fluid in amounts of from about 0.005 weight percent to about 0.50 weight percent, preferably about 0.10 weight percent of said fluid.

It is often desirable, depending on the kill and suspension period, to have a gel stem plug 22 which will withstand a temperature range from about 300° F. to about 450° F. for from about 0.5 of a day to about 4 days. A thermally stable solid gel plug 24 and formation gel 22 can be obtained by mixing into the pumpable gel mixture a chemical known as an oxygen scavenger (such as sodium thiosulfate), preferably sodium thiosulfate. The concentration of the oxygen scavenger utilized, of course, will depend upon the thermal stability desired to be obtained for gel plug 24 and formation gel 22. However, as is preferred, it is anticipated that the concentration of the oxygen scavenger in the pumpable gel mixture will be from about 0.10 percent by weight to about 0.75 percent by weight, preferably 0.50 percent by weight.

Cement plug 20 can be removed from wellbore 12 by drilling. However, the formation gel 22 and gel plug 24 can also be removed in several ways. Several variations are provided for. One variation, which can be utilized to facilitate removal of gel plug 24 from wellbore 12 and formation gel 22 is to form a solid gel plug 24 or formation gel 22 containing a gel breaker. This gel breaker, included in the gel mixture, is selected from a group of chemical compounds which can break down the solid gel at temperatures of less than from about 60° F. to about 250° F. Generally, this breakdown will occur within from about 2 hours to about 24 hours depending upon the type and concentration of breaker added. Chemicals satisfactory for use as gel breakers, and which are incorporated into the gel mixture, include enzymes and oxidizing agents (such as sodium persulfate) suitable for breaking down the solid gel. Other gel breakers sufficient for this purpose are discussed in U.S. Pat. No. 4,265,311 issued to Ely on May 6, 1981, which is hereby incorporated by reference. These chemicals are readily available from chemical suppliers and with the exception of enzyme breakers are sold under their chemical names. Enzyme breakers can be obtained from oil field service companies. The concentration of a gel breaker incorporated into the gel mixture will vary from about 0.01 weight percent to about 0.10 weight percent, preferably about 0.05 weight percent of the gel mixture. Upon cooling to a temperature of from about 60° F. to about 150° F., the gel breaker will breakdown the solid gel causing it to liquify which will facilitate removal of gel plug 24 and formation gel 22.

Another method for breaking the gel is to contact the solidified gel with a mineral acid suitable for removing cement plug 20 after a desired time interval. In those instances where it is undesirable to have a gel breaker incorporated into the gel mixture to remove the solid gel plug 24 or formation gel 22, it is preferred to use hydrochloric acid of a strength sufficient to solubilize the solid gel plug 24 and formation gel 22 without attacking formation 10. Hydrochloric acid, and acids similar thereto, can be used to breakdown the solid gel on contact. Hydrochloric acid of a concentration of about 10 percent to about 28 percent preferably about 15 percent, by volume of solution, will generally be sufficient for this purpose. Although hydrochloric acid has been mentioned, other similar mineral acids and strong organic acids may be employed depending upon their availability, as is known to those skilled in the art.

In one example of the practice of this invention, a slurry is formed with 1,000 gallons of water. This slurry comprises about 40 pounds of base gel such as hydroxypropyl guar gum which forms a hydrate in the water. To this mixture is added about 600 pounds of hydroxypropyl guar gum which has been chemically treated to provide delayed hydration and thickening properties. Approximately 20 pounds of a buffer or catalyst suitable to obtain the desired pH and reaction time is added to this mixture. Cross-linking agents, such as borates and chromates, are then added in an amount of about 20 pounds. Forty-two pounds of sodium thiosulfate, an oxygen scavenger, is then added to the mixture. This gel mixture is pumped into the formation 10 into the productive interval. After solidification of the mixture and the elapse of the desired suspension time, solidified gel plug 24 and formation gel 22 are removed by contacting them with 15 volume percent of hydrochloric acid in an amount sufficient to solubilize the gel compositions.

In another example of the practice of this invention, a mixture is made as above. Additional components are placed into the mixture. About 420 pounds of crushed oyster shells are next added to the mixture. Titanium, in an amount of about 4 pounds, is added to the mixture. Approximately 170 pounds of potassium chloride is subsequently added to the mixture. Four pounds of sodium persulfate is added to the mixture and serves as a gel breaker. Upon solidification, the gel plug 24 and formation gel 22 are capable of withstanding greater pressures. By chemical dehydration, the solidifed gel is liquefied by the sodium persulfate gel breaker.

As is understood by those skilled in the art, the composition of a gel plug or a formation gel will depend upon many variables including formation conditions. The above examples are mentioned as two possible variations among many others.

Although the present invention has been described with preferred embodiments, it is to be understood that modifications and variations may be resorted to without departing from the spirit and scope of this invention, as those skilled in the art will readily understand. Such modifications and variations are considered to be within the purview and scope of the appended claims.

We claim:

1. A method for shutting in a well which minimizes damage to a formation comprising:
   (a) placing into said formation a solution containing water and a chemical blowing agent;
   (b) causing said chemical blowing agent to decompose thereby liberating a gas which forces formation fluids away from a wellbore into said formation;
   (c) pumping a solidifiable gel mixture into the formation's productive interval via said wellbore while formation fluids are being forced away and precluded from said wellbore;
   (d) causing said gel mixture to become a solid thereby forming a gel plug within said wellbore and a formation gel within said formation sufficient to withstand environmental formation conditions and pressures which cause hydrocarbonaceous fluids to flow into said wellbore from the formation areas near said wellbore;
   (e) placing in said wellbore on top of said plug an amount of cement sufficient to isolate said productive interval when said cement hardens while being supported by said plug; and
   (f) allowing said cement to set which set cement in combination with said gel plug is competent to exclude production fluids from said wellbore.

2. The method as recited in claim 1 where said water comprises fresh water, formation brine, sea water, or brackish water.

3. The method as recited in claim 1 where said chemical blowing agent is a member selected from the group consisting of dinitrosopentamethylenetetramine, azodicarbonamide, and p,p'-oxybis(benzene sulfonyl hydrazide).

4. The method as recited in claim 1 where said chemical blowing agent is azodicarbonamide where decomposition is accelerated by alkali carbonates.

5. The method as recited in claim 1 where said chemical blowing agent is an alkali metal salt of azodicarboxylic acid which upon decomposition liberates nitrogen and carbon dioxide gases.

6. The method as recited in claim 1 where said liquid solution is injected into said formation by at least one injection well.

7. The method as recited in claim 1 where hydrocarbonaceous fluids are produced from said formation by at least one production well.

8. The method as recited in claim 1 where said liquid solution contains therein a pH adjustor, an accelerator, or an inhibitor sufficient to provide for variable propagation distances within said formation prior to gas generation.

9. The method as recited in claim 1 where said chemical blowing agent comprises sodium hydrogen carbonate and p-toluene sulfonyl hydrazide which decompose to release nitrogen and carbon dioxide gases.

10. The method as recited in claim 1 where said blowing agent is contained in said liquid solution in from about 0.05% to about 5.0% by weight.

11. A method for shutting in a well which minimizes damage in a formation comprising:
    (a) placing into said formation a solution containing water, a surfactant, and a chemical blowing agent;
    (b) causing said chemical blowing agent to decompose thereby forming a foam with said surfactant which foam establishes fluid flow, minimizes fluid retention, and forces formation fluids away from a wellbore in said formation;
    (c) pumping a solidifiable gel mixture into the formation's productive interval via said wellbore while formation fluids are being forced away and precluded from said wellbore;
    (d) causing said gel mixture to become a solid thereby forming a gel plug within said wellbore and a formation gel within said formation sufficient to withstand environmental formation conditions and pressures which cause hydrocarbonaceous fluids to flow into said wellbore from the formation areas near said wellbore;
    (e) placing in said wellbore on top of said plug an amount of a light weight or foamed cement sufficient to isolate said productive interval while being supported by said plug; and
    (f) allowing said cement to set which set cement in combination with said gel plug is competent to exclude productive fluids from said wellbore.

12. The method as recited in claim 11 where said water comprises fresh water, formation brine, sea water, or brackish water.

13. The method as recited in claim 11 where said chemical blowing agent is a member selected from the group consisting of dinitrosopentamethylenetetramine, azodicarbonamide, p,p'-oxybis(benzenesulfonyl hydrazide).

14. The method as recited in claim 11 where said chemical blowing agent is azodicarbonamide where decomposition is accelerated by alkali carbonates.

15. The method as recited in claim 11 where said chemical blowing agent is an alkali metal salt of azodicarboxylic acid which upon decomposition liberates nitrogen and carbon dioxide gases.

16. The method as recited in claim 11 where said liquid solution is injected into said formation by at least one injection well.

17. The method as recited in claim 11 where hydrocarbonaceous fluids are produced from said formation by at least one production well.

18. The method as recited in claim 11 where said liquid solution contains therein a pH adjustor, an accelerator, or an inhibitor sufficient to provide for variable propagation distances within said formation prior to gas generation.

19. The method as recited in claim 11 where said chemical blowing agent comprises sodium hydrogen carbonate and p-toluene sulfonyl hydrazide which decompose to release nitrogen and carbon dioxide gases.

20. The method as recited in claim 11 where said blowing agent is contained in said liquid solution in from about 0.05% to about 5.0% by weight.

21. A method for shutting in a well which minimizes damage to a formation comprising:
    (a) placing into said formation a solution containing water and a chemical blowing agent and which agent is a member selected from the group consisting of sodium hydrogen carbonate and p-toluene sulfonyl hydrazide, an alkali metal salt of azodicarboxylic acid, azodicarbonamide, dinitrosopentamethylenetetramine, and p,p'-oxobis(benzenesulfonyl hydrazide);
    (b) causing said chemical blowing agent to decompose thereby liberating a gas which forces formation fluids away from a wellbore in said formation;
    (c) pumping a solidifiable gel mixture into the formation's productive interval via said wellbore while formation fluids are being forced away and precluded from said wellbore;

(d) causing said gel mixture to become a solid, thereby forming a gel plug within said wellbore and a formation gel within said formation sufficient to withstand environmental formation conditions and pressures which cause hydrocarbonaceous fluids to flow into said wellbore from the formation areas near said wellbore;

(e) placing in said wellbore on top of said plug an amount of cement sufficient to isolate said productive interval when said cement hardens while being supported by said plug;

(f) allowing said cement to set which set cement in combination with said gel plug is competent to exclude productive fluids from said wellbore;

(g) causing said solid formation gel, said gel plug, and said hardened cement to be removed after the well has been shut in for a desired time interval; and (h) producing thereafter hydrocarbonaceous fluids from said formation via said wellbore.

22. The method as recited in claim 21 where said water comprises fresh water, formation brine, sea water, or brackish water.

23. The method as recited in claim 21 where said chemical blowing agent is azodicarbonamide where decomposition is accelerated by alkali carbonates.

24. The method as recited in claim 21 where said liquid solution is injected into said formation by at least one injection well.

25. The method as recited in claim 21 where hydrocarbonaceous fluids are produced from said formation by at least one production well.

26. The method as recited in claim 21 where said liquid solution contains therein a pH adjustor, an accelerator or an inhibitor sufficient to provide for variable propagation distances within said formation prior to gas generation.

27. The method as recited in claim 21 where said blowing agent is contained in said liquid solution in from about 0.05% to about 5.0% by weight.

28. The method as recited in claim 21 where said chemical blowing agent decomposes in the formation thereby releasing a gas which prevents formation fluids from flowing from the formation prior to solidification of said gel.

29. The method as recited in claim 21 where azodicarbonamide is dispersed in a solution of water containing a surfactant.

* * * * *